United States Patent [19]
Lochman et al.

[11] 3,970,609
[45] July 20, 1976

[54] METHOD FOR PREPARATION OF POLYMETHACRYLATES BY THE ANIONIC POLYMERIZATION

[75] Inventors: Lubomír Lochman; Miroslava Rodová; Jiří Trekoval, all of Prague, Czechoslovakia

[73] Assignee: Ceskoslovenska akademie ved, Prague, Czechoslovakia

[22] Filed: May 6, 1974

[21] Appl. No.: 467,575

[30] Foreign Application Priority Data
May 7, 1973 Czechoslovakia ............... 3228-73

[52] U.S. Cl. .............................. 526/89; 526/209; 526/213; 526/328
[51] Int. Cl.² ..................................... C08F 120/14
[58] Field of Search ............... 260/89.5 R, 89.5 A

[56] References Cited
UNITED STATES PATENTS

| | | | |
|---|---|---|---|
| 3,410,836 | 11/1968 | Hsieh | 260/89.5 A |
| 3,631,006 | 12/1971 | Hawkins | 260/89.5 A |
| 3,679,644 | 7/1972 | Van Der Meij et al. | 260/89.5 A |
| 3,761,529 | 9/1973 | Drahoslav et al. | 260/89.5 A |

*Primary Examiner*—Harry Wong, Jr.
*Attorney, Agent, or Firm*—Murray Schaffer

[57] ABSTRACT

A method for preparation of polymethacrylate esters by the anionic polymerization characterized by application of new initiation systems based on esters of α-lithio carboxylic acids having 2–30 carbon atoms in a straight or branched chain and 1–6 ester groups in a molecule, or on their adducts or complexes with lithium alkoxides having 3–16 carbon atoms in a straight or branched chain. The polymerization is carried out at temperatures $-70°$ to $+50°$ C, preferably at $+20°$ C, with the monomer - to - initiator ratio equal 10 to 1500. The polymers which have new mechanical and solution properties due to the new preparation method are suitable as additives into mineral oils increasing their viscosity indexes and suppressing their solidification temperature, as a cement in medical practice, and the like.

8 Claims, No Drawings

METHOD FOR PREPARATION OF POLYMETHACRYLATES BY THE ANIONIC POLYMERIZATION

The invention relates to a method for preparation of polymethacrylic esters by the anionic polymerization. Till now, this polymerization has been most frequently carried out with organic compounds of lithium, viz. either with organolithium compounds, as n-butyllithium (D. M. Wiles, S. Bywater: Polymer 1962, 3, 175), 1,1-diphenylhexyllithium (D. M. Wiles, S. Bywater: Trans. Faraday Soc. 1965, 61, 150), or with lithium alkoxides, especially the tertiary ones (D. Lim, J. Trekoval: Czechoslovak patent No. 112.248; J. Trekoval, D. Lim: J. Polymer Sci. Part C, 1963, 4, 333). Only a small part of the initiator (less than 10%) is utilized in the formation of growth centres if the polymerization is initiated with organolithium compounds, while the remaining part is consumed in side reactions. To reduce the extent of side reactions and to achieve a reasonable conversion of the monomer, the polymerizations are carried out at considerably low temperatures (e.g. at $-30°$ C). However, considerable amounts of the initiator has to be used even at these conditions (e.g. the methyl methacrylate - to - butyllithium ratio equal 30). These shortcomings do not take place if lithium alkoxides are used, which give at low initiator concentration (e.g. the methyl methacrylate - to - lithium tert-hexyl alcoholate ratio equal 230) good polymer yields also at the temperature around 20° C. However, the polymerization initiated by lithium alkoxides proceed very slowly, during several hours or even days and this may cause difficulties under some circumstances, e.g. in the polymerization which is carried out in a through-flow reactor or controlled by the gradual metering of the initiator.

In attempts to prepare an initiator which would not exhibit the above mentioned disadvantages, it was assumed that the growth centrum in the anionic polymerization of methacrylic esters has a structure of $\beta$-substituted isobutyrate metallated in the $\alpha$-position (D-L-Glusker, I Lysloff, E. Stiles: J. Polymer Sci. 1961, 49, 315) and that the polymerization initiators having the structure similar to the growth centrum should exhibit advantageous properties. Therefore, some $\alpha$-lithio esters were prepared in the pure state (L. Lochmann, D. Lim: Czechoslovak patent No. 153,790. The preparation and properties of $\alpha$-lithio esters is also described in J. Organometal. Chem. 50, 9, 1973, J. Polymer Sci., Chem. Edit., 12, 2295 (1974) and Collection of Czechoslov. Chem. Commun. 38, 1780 (1973). During a study of properties of $\alpha$-lithio esters it was found that they give polymethacrylate esters in a good yield even at the ambient temperature with high efficiency and that the polymerization proceeds very rapidly being almost completed during several minutes. All poly(methyl methacrylates) obtained by action of $\alpha$-lithio esters have a high content of the isotactic component (about 70%).

An objective of the invention is the method for preparation of polymethacrylate esters by the anionic polymerization, wherein a solution of $\alpha$-lithio esters of the carboxylic acid containing advantageously 2 – 30 carbon atoms in the straight or branched chain and 1 – 6 ester groups in a molecule of a high purity grade is added to a methacrylate solution in aromatic hydrocarbon or aliphatic ether as the polymerization initiator in the amount given by the methacrylate - to - lithio ester ratio equal 10 to 1500 and either in one or in more portions at the temperature ranging from $-70$ to $+50°$ C. The isolated pure compound or a fresh reaction mixture containing $\alpha$-lithio ester which has been prepared from substituted lithium amide and ester (Czechoslovak patent 153,790) or by mixing of anorganolithium compound, secondary amine and carboxylic ester can be used as the high-purity $\alpha$-lithio ester. The fact important for the technical application consists in the existence of the method of preparation of $\alpha$-lithio esters which gives these lithio esters sufficient purity even in the reaction mixture, so that the fresh reaction mixture may be used directly for the initiation of the polymerization without isolating the individual $\alpha$-lithio ester. The achieved polymerization results are in this case only slightly worse than when using the isolated $\alpha$-lithio ester (see Table). This is caused above all by a lower purity of the initial alkyllithium compound.

Another property of $\alpha$-lithio esters is their ability to creat complexes with lithio alkoxides. Some of these complexes were proved and isolated. Among various mechanisms proposed for the anionic polymerization of methacrylates, also lithium alkoxides take part. Therefore, the initiation effect of the prepared complexes was followed. The complexes were found to have even higher initiation capacity than the $\alpha$-lithio esters alone.

Another distinction of the invention is that the polymerization may be carried out in the presence of lithium alkoxide containing 3 – 16 carbon atoms in the straight or branched chain and in the amount given by the lithium alkoxide - to - $\alpha$-lithio ester ratio ranging from 0.5 to 8.0. Lithium alkoxide may be mixed with $\alpha$-lithio ester before its addition into methacrylate or lithium alkoxide may be mixed with methacrylate shortly before addition of $\alpha$-lithio ester or the combination of both these methods can be used. The reason why the contact of lithium alkoxide with methacrylate should be short lasting is limiting of undesirable side reactions of both compounds before $\alpha$-lithio ester is added.

The polymer yield was almost doubled and its average molecular weight and content of the isotactic component were also somewhat higher when lithium tert-butoxide was added to the polymerization of methyl methacrylate with the same amount of $\alpha$-lithio ester. Similarly, the same degree of conversion was achieved in the polymerization of methyl methacrylate with 3½ times less $\alpha$-lithio ester metered as the initiator, if lithium tert-butoxide was present. The polymerization initiated by the complexes of $\alpha$-lithio esters with alkoxides proceed very rapidly, and therefore the increased effect of complexes cannot be ascribed to the action of lithium alkoxide only, but its interaction needs to be assumed also in the individual reactions of the polymerization process. In agreement with this assumption, a decrease of the reaction rate was observed in the model reaction of termination, i.e. in the Claisen condensation of ethyl $\alpha$-lithiosisobutyrate, if lithium tert-butoxide was present.

Therefore, we suppose that the higher polymer yields obtained with lithio esters in the presence of alkoxides confirm the conception of a coordination bonding of alkoxide to the active polymerization growth centrum which is protected to some extent from termination in this way.

The following Table summarizes results of some polymerizations of methyl methacrylate induced by α-lithio esters or their complexes with lithium alkoxides.

the molar ratio 120 : 1. The yield was 41.3% of the crude polymer and 38.7% of the reprecipitated polymer; $\overline{M}_w = 93,000$; tacticity: I 64.5%, H 24.5%, S 11%.

TABLE

Result of methyl methacrylate polymerization in the toluene solution (0.63 mol/l) at 20°C induced by various initiators added in one portion. The methyl methacrylate - to - initiator ratio equal 120, polymerization time 1 hour.

| Initiator | Yield of the crude polymer % | Reprecipitated polymer | | | | |
|---|---|---|---|---|---|---|
| | | Yield % | $\overline{M}_w$ | Tacticity, % | | |
| | | | | I | H | S |
| $C_4H_9Li$ | 0 | — | — | — | — | — |
| $[C_4H_9Li.(CH_3)_3COLi]$ | 3.6 | — | — | — | — | — |
| $(CH_3)_2CLiCOOC_2H_5$ | 41.3 | 38.7 | 93.000 | 64.5 | 24.5 | 11 |
| $(CH_3)_2CLiCOOC_2H_5$, without isolation[+] | 36.2 | 32.6 | 110,000 | — | — | — |
| $(CH_3)_2C\text{——}CH_2\text{——}CLiCH_3$<br>   \|              \|<br>$COOC(CH_3)_3$  $COOC(CH_3)_3$ | 41.1 | — | — | 72 | 20 | 8 |
| $[(CH_3)_2CLiCOOC_2H_5.(CH_3)_3COLi]$ | 53.1 | 49.3 | 120,000 | 74 | 19 | 7 |
| $[(CH_3)_2CLiCOOC_2H_5\text{—}(CH_3)_2CHOLi]$ | 70.4 | — | — | 74 | 21 | 5 |
| $[(CH_3)_2CLiCOOC_2H_5.3\,(CH_3)_3COLi]$ | 75.1 | 71.4 | 115,000 | 72 | 20 | 9 |
| $[(CH_3)_2C\text{——}CH_2\text{——}CLiCH_3.3\,(CH_3)_3COLi]$<br>   \|              \|<br>$COOC(CH_3)_3$  $COOC(CH_3)_3$ | 84.4 | — | — | 74 | 18 | 8 |

[+]The amount of α-lithio ester used was calculated from the alkality of butyllithium which was used in its preparation.

The results of experiments obtained with other intiators under same conditions are included for comparison. Table contains the series of experiments chosen to show the distinctive difference in properties of various initiators.

As follows from the examples, substantially higher yields may be attained even by a small decrease of temperature or by increasing the monomer concentration in the polymerization (e.g. to 20%). This advantage exhibits itself favourably also in a lower consumption of the solvent. The given method of polymerization is suitable also for preparation of polymethacrylates with longer alkyls, e.g. poly(n-octyl methacrylate), which are used as additives into mineral oils.

The following are some examples of the method for preparation of polymethacrylate esters according to the invention.

EXAMPLE 1

All operations with organometallic compounds as well as the very polymerization were carried out in the atmosphere of argon or nitrogen. Toluene was rectified and then refined by distillation with sodium benzophenone ketyl; methyl methacrylate was commonly purified and shortly before polymerization distilled with calcium hydride in vacuo. To the stirred mixture of 60 ml of toluene and 4.7 g of methyl methacrylate, 10 ml of a toluene solution containing 0.191 g of ethyl α-lithioisobutyrate was added at 20° C (i.e. the methyl methacrylate - to - α-lithio ester ratio equal 30). The reaction mixture was stirred 1 hour at the given temperature, the polymerization was then stopped by addition of 2.5 ml of methanol and the crude polymer was precipitated with hexane. The polymer was then twice reprecipitated into hexane from the toluene solution, the dry polymer was freed from alkaline initiator residue by washing with water and then dried to a constant weight in vacuo 1 mmHg. The yield was 3.99 g of poly(methyl methacrylate), i.e. 83.1%. Found: $\overline{M}_w = 130,000$; tacticity (from NMR spectra): I 70%, H 22%, S 8%.

EXAMPLE 2

Similarly as in Example 1, 4.7 g of methyl methacrylate was mixed with ethyl α-lithio isobutyrate solution in

EXAMPLE 3

Similarly as in Example 2, however the freshly prepared reaction mixture of n-butyllithium, diisopropylamine and ethyl isobutyrate was used instead of isolated ethyl α-lithioisobutyrate, in the amount corresponding to the methyl methacrylate - to - n-butyllithium ratio equal 120 (the concentration of butyllithium was determined by acidimetric titration). The yield was 36.2% of the crude polymer.

EXAMPLE 4

Similarly as in Example 2, the solution of 0.0477 g of ethyl α-lithioisobutyrate in 4.80 ml of toluene was mixed with 4.70 g of methyl methacrylate in 13.5 ml of toluene (i.e. the methyl methacrylate - to - lithio ester molar ratio equal 120; concentration of methyl methacrylate in the reaction mixture was 20%). The yield of the crude polymer was 2.950 g, i.e. 63.0%.

EXAMPLE 5

Similarly as in Example 1, the solution of 0.0477 g of ethyl α-lithioisobutyrate in 4.80 ml of toluene was added to 4.70 g of methyl methacrylate in 65 ml of toluene (i.e. the methyl methacrylate - to - lithio ester ratio equal 120) at 1.5° C. The yield was 3.250 g of the crude polymer, i.e. 69.2% of the theory.

EXAMPLE 6

Similarly as in Example 1, 4.7 g of methyl methacrylate was allowed to react with the solution containing 0.0637 g of ethyl α-lithioisobutyrate and 0.125 g of lithium tert-butoxide (i.e. the molar ratio 1 : 3 and the methyl methacrylate - to - αester ratio equal 90). It was obtained 4.57 g of the polymer, i.e. 97.5%; found $\overline{M}_w = 125,000$; tacticity I 73%, H 19%, S 8%.

EXAMPLE 7

Similarly as in Example 1, 4.31 g of methyl methacrylate in 60 ml of toluene was allowed to react with 3.3 ml of the toluene solution containing 0.033 g of ethyl α-lithioisobutyrate and 0.0627 g of lithium tert-butoxide (i.e. molar ratio 1 : 3), which was added in 20 portions (methyl methacrylate - to - lithio ester ratio equal 160). The yield was 85.2% of the polymer.

EXAMPLE 8

Similarly as in Example 1, the solution containing 0.0477 g of ethyl α-lithioisobutyrate and 0.0260 g of lithium isopropoxide (i,e. molar ratio 1 : 1) was added to 4.70 g of methyl methacrylate in 65 ml of toluene (i.e. the methyl methacrylate - to - lithio ester equal 120). It was obtained 3.31 g of crude polymer, i.e. 70.4% of the theory.

EXAMPLE 9

Similarly as in Example 1, the solution containing 0.0477 g of ethyl α-lithioisobutyrate and 0.0260 g of lithium isopropoxide in 4.80 ml of toluene (i.e. the molar ratio 1 : 1) was mixed with the solution of 4.31 g of n-octyl methacrylate in 13.5 ml of toluene) i.e. the n-octyl methacrylate - to - lithio ester molar ratio equal 55; the concentration of methacrylate in the reaction mixture was 18.5%). The yield was 4.285 g of the crude polymer, i.e. 99.5% of the theory.

EXAMPLE 10

Similarly as in Example 1, 4.80 ml of toluene solution containing 0.0418 g of N-lithium diisopropylamine and 0.112 g of di-tert-butyl α,α',α'-trimethylglutarate was added to the solution of 4.70 h og methyl methacrylate in 65 ml of toluene. This correspond to the methyl methacrylate - to - di-tert-butyl α,α',α'-trimethylglutarate molar ratio 120. The yield was 1.930 g of the crude polymer, i.e. 41.1% of the theory.

EXAMPLE 11

Similarly as in Example 10, 4.80 ml of the solution containing 0.0418 g of N-lithium diisopropylamide, 0.112g of di-tert-butyl α,α',α'-trimethylglutarate and 0.0922 g of lithium tert-butoxide was added to the solution of 4.70 g of methyl methacrylate in 65 ml of toluene (i.e. the alkoxide - to - di-tert-butyl α,α',α'-trimethylglutarate molar ratio equal 3 and methyl methacrylate - to - lithio ester equal 120). The yield was 3.970 g of the crude polymer, i.e. 84.4% of the theory.

EXAMPLE 12

Similarly as in Example 1, the solution containing 0.0222 g of ethyl α-lithioisobutyrate and 0.146 g of lithium tert-butoxide in 4.6 ml of toluene (i.e. the alkoxide - to -α-lithio ester molar ratio equal 10) was added to 4.70 g of methyl methacrylate in 65 ml of toluene (i.e. the methyl methacrylate - to - lithio ester ratio equal 258). The yield was 3.71 g of the crude polymer, i.e. 79.1%.

EXAMPLE 13

Similarly as in Example 1, the solution containing 0.0477 g of ethyl α-lithioisobutyrate and 0.0634 g of lithium (-)methoxide in 4.8 ml of toluene (i.e. the molar ratio 1 : 1 was mixed with 4.70 g of methyl methacrylate in 65 ml of toluene (the methyl methacrylate - to - α-lithio ester molar ratio equal 120). It was obtained 3.3 g of the crude poly(methyl methacrylate), i.e. 70.2%.

We claim:

1. Method for the preparation of polymers of methacrylate esters by anionic polymerization wherein said polymer consists essentially of said esters, comprising the steps of polymerizing at least a methacrylate monomer in the presence of an initiator and a solvent, said initiator being an α-lithio ester of carboxylic acid containing from 2 to 30 carbon atoms in a straight or branched chain and 1 to 6 alkyl ester groups bound to different carbon atoms, and said solvent being an aromatic or aliphatic hydrocarbon or organic ether, said polymerization being carried out at a temperature in the range from between $-70°$ to $+50°$ for a time sufficient to form said polymers.

2. A method according to claim 1, wherein the polymerization is carried out in the presence of lithium alkoxide which contains 3 – 16 carbon atoms in a straight or branched chain in an amount given by the lithium alkoxide - to -α-lithio ester ratio ranging 0.5 to 80.

3. A method according to claim 1, wherein lithium alkoxide is mixed with α-lithio ester before addition to methacrylate ester.

4. A method according to claim 1, wherein lithium alkoxide is mixed with methacrylate ester shortly before addition of α-lithio ester.

5. The method according to claim 1 where each of said methacrylate ester and said α-lithio ester are dissolved independently of said solvent thereafter admixed.

6. The method according to claim 5 wherein said α-lithio ester is an isolated substantially pure compound containing at least 80% molar of α-lithio ester.

7. The method according to claim 1 wherein said α-lithio ester is obtained as the product of the fresh reaction of a mixture of a substituted lithium amide and a carboxylic acid in a molar ratio ranging from 1 to 6:0.5.

8. The method according to claim 1 wherein said α-lithio ester is obtained by mixing an organo-lithium compound, a secondary amine and a carboxylic acid ester at a molar ratio ranging from 1:0.9 to 2:0.7 to 1.1, within a temperature range of from $-70°$ to $30°C$.

* * * * *